March 28, 1967 J. F. CULP 3,310,948
VARIABLE THRUST PROPULSION SYSTEM FOR AIRCRAFT
Filed Nov. 17, 1965 2 Sheets-Sheet 1
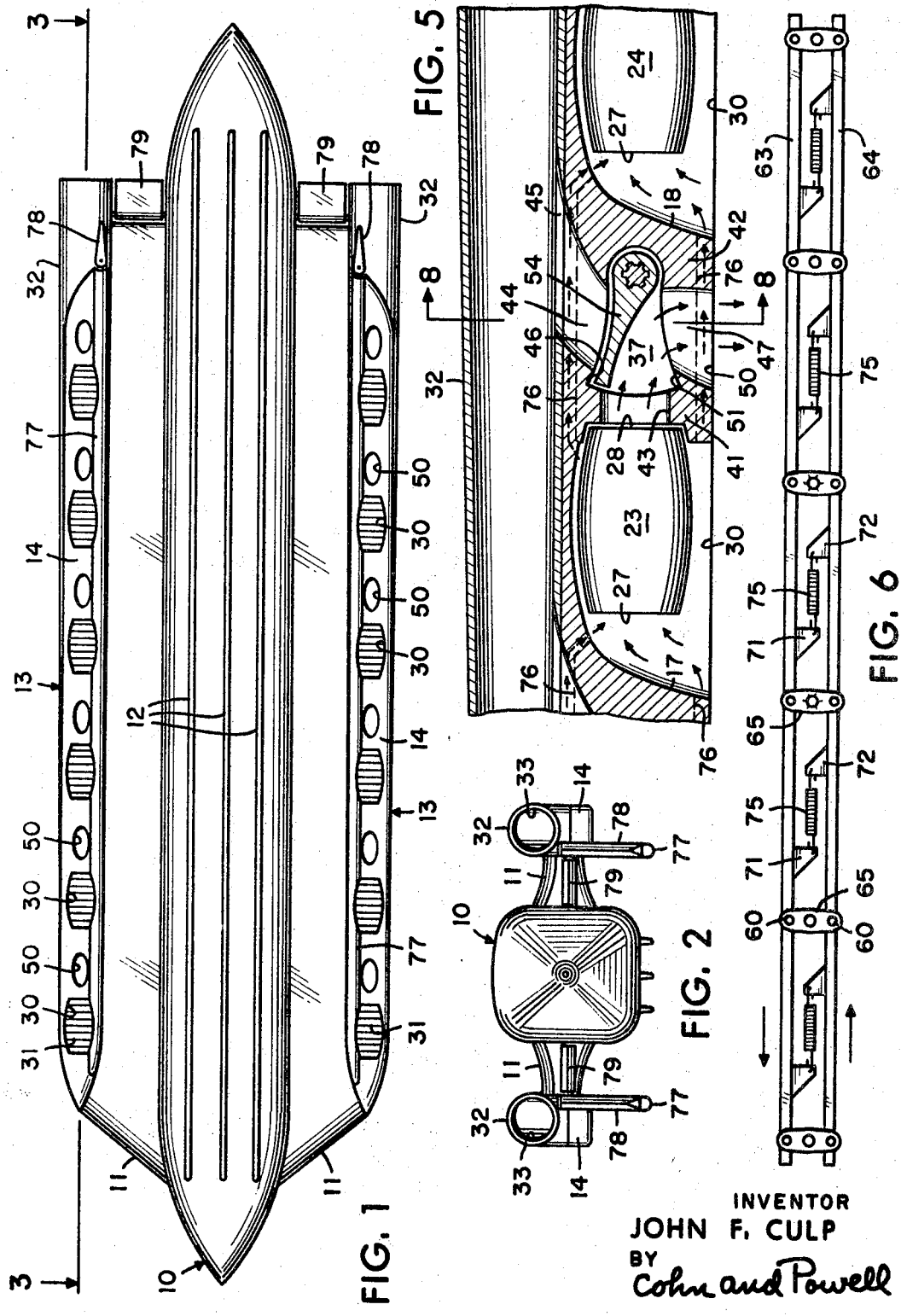
INVENTOR
JOHN F. CULP
BY
Cohn and Powell
ATTORNEYS March 28, 1967    J. F. CULP    3,310,948
VARIABLE THRUST PROPULSION SYSTEM FOR AIRCRAFT
Filed Nov. 17, 1965    2 Sheets-Sheet 2
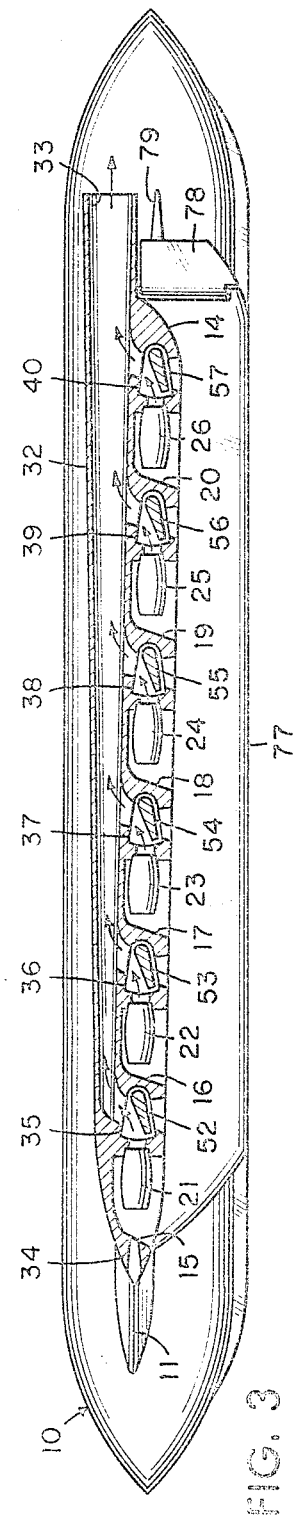

United States Patent Office 3,310,948
Patented Mar. 28, 1967

3,310,948
VARIABLE THRUST PROPULSION SYSTEM FOR AIRCRAFT
John F. Culp, Rte. 1, Box 163, Bell City, Mo. 63735
Filed Nov. 17, 1965, Ser. No. 508,239
11 Claims. (Cl. 60—229)

This invention relates generally to improvements in a variable thrust propulsion system, and more particularly to a propulsion system adapted for use in a vertical lift-off aircraft.

It is well known that conventional, forward thrust jet-powered aircraft require extremely long runways for safe take-off. As a consequence, great expenditures are made on airports to provide runways of sufficient length to accommodate the ever-increasing landing and take-off areas necessary for large capacity passenger and freight aircraft. Moreover, large terminal airports must of necessity be built at considerable distances from the cities that they service. This situation is inconvenient to both passengers and shippers. Vertical take-off aircraft overcome these disadvantages.

It is an important objective to provide a propulsion system for selectively directing the efflux from a plurality of jet engine units so that forward motion can be achieved, or so that a lift can be afforded to facilitate take-off from the ground, or so that a combination of forward thrust and lift can be obtained with precise regulation as to the predominance and effectiveness of each component for improved maneuverability.

An important objective is achieved by the provision of a variable thrust propulsion system for a jet-powered aircraft which includes a plurality of jet engine units mounted in a power tube and located in adjacent longitudinal relation with their intake orientated longitudinally in one direction and their exhaust orientated in the opposite direction, an elongate thrust tube extending longitudinally adjacent to the power tube, the thrust tube having discharge port for directing efflux rearwardly, and control means selectively directing the efflux of the engine units from the power tube into the thrust tube for forward thrust or downwardly from the power tube for lift.

Another important object is realized by the provision of duct means in the power tube interconnecting longitudinally adjacent engine units for passing the heated ambient air of one engine unit to the intake of the next adjacent and rearwardly located engine unit, whereby to effect a cooling of said one engine unit.

Yet another important objective is afforded by constructing the thrust tube with a progressively increasing cross-sectional area longitudinally to accommodate the efflux directed into the thrust tube along its length from successive engine units.

An important objective is attained by the structural arrangement in which the power tube includes a plurality of engine chambers lengthwise of the tube, each chamber housing an engine unit, includes a deflector chamber located rearwardly of each engine chamber, and includes an exit passage communicating the exhaust of each engine unit with its associated deflector chamber, and by the provision of an adjustable element in the deflector chamber for selectively diverting efflux from the deflector chamber to the thrust tube or downwardly from the power tube.

Another important objective is provided in that the engine-cooling duct means in the power tube interconnects the engine chambers of longitudinally adjacent engine units for passing heated ambient air of one engine unit in one engine chamber to the engine chamber and intake of the next adjacent and rearwardly located engine unit, the duct means bypassing the deflector chamber of said one engine unit.

Still another important objective is achieved by the provision of deflector chambers, each of which has a first outlet port to the thrust tube and has a second outlet port directed downwardly for lift, and of a deflector flap mounted in each deflector chamber and movable selectively between a first position to close the first outlet and divert efflux from the exhaust of the associated engine unit through the second outlet for lift, and a second position to close the second outlet and divert the efflux through the first outlet and into the thrust tube.

An important objective is realized by the provision of a flap-controlling means that synchronizes movement of the deflector flaps and which includes a pair of spaced elongate links extending lengthwise of the power tube and interconnected by a plurality of intervening crosshead yokes, and a shaft attached to each deflector flap and to one of the yokes, whereby the links cause simultaneous rotative movement of the yokes and associated shafts to oscillate the flaps between the first and second positions.

Another important objective is afforded by the provision of means interconnecting the pair of spaced links and imparting longitudinal movement in opposite directions to the respective links to cause rotation of the shafts selectively in either direction incident to positioning of the flaps.

It is an important objective to balance substantially the torsional force exerted on the yokes by the gravitational action of the deflector flaps through the connecting shafts by the provision of resilient means operatively interconnecting the pair of spaced links.

An important objective is provided by the provision of a propulsion system that can be located in the fuselage of the aircraft, or can be disposed on opposite sides of the aircraft fuselage, or can be located in multiple combinations by mounting on the fuselage and wings.

Another important object is attained by the provision of a control mechanism for operating dual or multiple banks of jet engine units in unison.

An important object is to provide a propulsion system that is simple and durable in construction, economical to manufacture and assemble, efficient in operation, and which can be readily actuated to control flight characteristics.

The foregoing and numerous other objects and advantages of the invention will more clearly appear from the following detailed description of a preferred embodiment, particularly when considered in connection with the accompanying drawings, in which:

FIG. 1 is a bottom plan view of the aircraft;
FIG. 2 is a rear end view of the aircraft;
FIG. 3 is an elevational view, partly in cross-section, taken along line 3—3 of FIG. 1, the control mechanism being conditioned for forward thrust;
FIG. 4 is a side elevational view similar to FIG. 3, but illustrating the control mechanism conditioned for vertical lift;
FIG. 5 is an enlarged, fragmentary longitudinal cross-section illustrating the structural relationship of the power tube, thrust tube and deflector flap;
FIG. 6 is a side elevational view of the flap-controlling mechanism;
FIG. 7 is a fragmentary plan view of the flap-controlling mechanism, and
FIG. 8 is a fragmentary, cross-sectional view taken on line 8—8 of FIG. 5.

Referring now by characters of reference to the drawings, and first to FIGS. 1–4 inclusive, it will be understood that the jet-powered aircraft includes an elongate fuselage 10 having laterally and oppositely extending stub wings 11. Depending from the fuselage 10 are a plurality of elongate and longitudinally disposed landing skids 12.

The jet-powered propulsion system includes a pair of thrust banks generally indicated by 13, one of the thrust banks 13 being disposed at the lateral extremity of each stub wing 11. In view of the fact that the construction of the thrust banks 13 is identical, a detailed description of one will suffice for the other. Moreover, for brevity and clarity, the same reference numbers will be utilized to denote corresponding structure wherever possible.

Each thrust bank 13 includes an elongate, substantially horizontal power tube 14 of substantially rectangular cross-section. The power tube 14 is compartmentalized along its length to provide a plurality of separate engine chambers 15–20 inclusive. A jet engine 21–26 is mounted and housed in each of the engine chambers 15–20 respectively. These engine units 21–26 are located in adjacent relation with their intakes 27 orientated longitudinally in a forward direction and their exhausts 28 orientated in the opposite or rearward direction.

The floor of each engine chamber 15–20 is provided with an air intake 30 directed downwardly below the power tube 14, the air intake 30 serving to communicate the engine intake 27 of the associated engine unit with the atmosphere. The air intake 30 is covered with louvres 31 adapted to preclude entry of foreign matter into the engine chamber, yet serving to direct air into such chamber.

Located superjacent and longitudinally parallel to the power tube 14 is an elongate thrust tube 32 having a discharge port 33 at the rear of the aircraft. As is best illustrated in FIGS. 3 and 4, the thrust tube 32 is provided with a fluted nose cone 34 to augment the intake of air to the foremost engine chamber 15. For reasons which will later appear upon more detailed description of parts, the thrust tube 32 progressively increases in cross-sectional area along its length to accommodate the efflux from successive engine units 21–26.

Formed in and located immediately rearward of each of the engine chambers 15–20 is a separate deflector chamber 35–40 respectively. A partition 41 separates each engine chamber 15–20 with its associated deflector chamber 35–40 respectively, while another partition 42 separates each deflector chamber 35–39 from the next adjacent and rearwardly located engine chamber 16–20 respectively.

The front partition 41 for each deflector chamber 35–40 is provided with a transfer passage 43 that communicates directly with the preceding, associated engine unit 21–26 respectively, whereby the efflux from the engine unit is directed into the deflector chamber.

As is shown best in FIG. 5, each deflector chamber 35–40 includes an upper discharge passage 44 having an outlet 45 communicating with the thrust tube 32. The power tube defining the deflector chamber 35–40 is constructed to form a closure seat 46 at the entrance to the upper discharge passage 44. Further, each deflector chamber 35–40 includes a lower discharge passage 47 having an outlet 50 directed vertically downward to discharge efflux from the power tube for vertical lift. The power tube defining the deflector chamber is constructed to form a closure seat 51 at the entrance to the lower discharge passage 47.

The control means selectively directing the efflux of the engine units 21–26 from the power tube 14 into the thrust tube 32 for forward thrust or downwardly from the power tube 14 for lift, includes a plurality of deflector flaps 52–57 inclusive disposed in the deflector chambers 35–40 respectively. Each deflector flap 52–57 is pivotally mounted in a journal 60 formed in the rear partition 42. A jack shaft 61 is rigidly attached to each deflector flap 52–57 and extends laterally outward of the power tube 14 into the adjacent stub wing 11. The deflector flaps 52–57 can be selectively oscillated by rotation of the jack shaft 61 to a first predetermined position in which the deflector flaps 52–57 engage the closure seats 46 to stop flow of the efflux into the thrust tube 32 and serve to direct such efflux through the lower discharge passages 47 and through the outlets 50 for lift, and a second predetermined position in which the deflector flaps 52–57 engage the closure seats 51 to preclude discharge of the efflux from the outlets 50 and serve to direct such efflux through the upper discharge passages 44 and into the thrust tube 32 through the outlets 45 for forward thrust.

A seal 62 is provided around each jack shaft 61 at the point where the jack shaft 61 enters the power tube 14 to preclude loss of efflux at this location and to prevent loss of thrust efficiency.

A flap-controlling mechanism operatively interconnects the deflector flaps 52–57 of each thrust bank 13 to provide synchronous operation. The flap-controlling mechanism includes a pair of spaced, upper and lower elongate links 63 and 64 extending parallel and longitudinally along each power tube 14 and located in the associated stub wing 11. Each pair of spaced links 63 and 64 are operatively interconnected and coupled by a plurality of crosshead yokes 65. Specifically, the yokes 65 extend between the spaced links 63 and 64 and are pivotally mounted by pins 66, as is clearly shown in FIG. 6. A plurality of pivot shafts 67 are mounted to and project outwardly from each side of the fuselage 10, the pivot shafts 67 being rotatively connected to the two outermost yokes 65 at each end of each pair of spaced links 63–64. A pair of drive shafts 70 are rotatively mounted between the sides of the fuselage 10, each of the shafts 70 having opposite ends projecting into the stub wings 11 for rigid attachment to one of the two yokes 65 centrally located in the oppositely disposed pairs of spaced links 63–64.

The drive shafts 70 and the pivot shafts 67 have their axes substantially aligned and parallel. The center of rotation of each of the yokes 65 is in line with the axis of rotation of a corresponding deflector flap 52–57. The jack shafts 61, on which the deflector flaps 52–57 are rigidly and rotatively mounted at one end, are rigidly and rotatively attached at their other ends to the yokes 65 at their axes of rotation.

A plurality of inwardly extending lugs 71 are rigidly attached to the inside faces of each pair of connecting links 63 and 64. The upper lugs 71 are located forwardly of the lower lugs 72, one of each being disposed between the yokes in longitudinally spaced relation to provide a lug set between yokes 65.

A double-acting hydraulic cylinder 73 is provided between the two innermost yokes 65 of at least one pair of spaced links 63–64, the cylinder 73 having its axis substantially parallel with the links 63–64. The double-acting hydraulic cylinder 73 is operatively connected and disposed between a set of lugs 71–72. It will be noted that upon expansion of the hydraulic cylinder 73, the links 63 and 64 are moved longitudinally in opposite directions to rotate the yokes 65, and hence swing the deflector flaps 52–57 downwardly in a direction toward the closure seats 51 to reduce or stop flow of the efflux from the vertical-lift outlets 50. The drive shafts 70 interconnecting the oppositely disposed pair of links 63–64 cause all of the deflector flaps 52–57 of both thrust banks 13 to act in unison.

A suitable back-up system can be provided to operate the flap-controlling mechanism in the event the hydraulic system fails to function because of "freezing" of the hydraulic cylinder 73 or for any other reason. One type of back-up system could employ an auxiliary electric motor 74, as an example, operatively connected to the drive shafts 70.

Attached to and located between each set of lugs 71–72 is a tension spring 75, the tension springs 75 serving to balance the weight of the deflector flaps 52–57 in the efflux control means. The springs 75 exert a push and pull force on the lugs 71–72 to which they are attached, and hence to the pairs of links 63–64, tending to balance the torsional force exerted on the yokes 65 by the gravitational action of the deflector flaps 52–57.

In each power tube 14, there are provided a plurality of cooling ducts 76 communicating the space about each engine unit 21–25 in the corresponding engine chamber 15–19 with the intake 27 of the next rearwardly adjacent engine unit 22–26 mounted in the corresponding engine chamber 16–20 respectively. These ducts 76 bypass the deflector chambers 35–39 intermediate longitudinally adjacent engine chambers 15–19. The ambient air about each engine unit 21–25 is drawn through the ducts 76 and is introduced into the rearwardly adjacent engine chamber 16–20 respectively and into the intake 27 of the associated engine unit 22–26 respectively, thereby cooling the forwardly adjacent engine unit 21–25 respectively. The heated ambient air of each engine unit 21–25 is discharged in the efflux of the rearwardly adjacent engine unit 22–26 respectively, into either the thrust tube 32 for forward thrust or through the vertical lift outlets 45 for lift, or through a combination of the two to attain a flight control incorporating a component of both forward and lift thrust.

The vertical lift propulsion system obviates the necessity for conventional landing wheels. In lieu of wheels, a pair of elongate landing skids 77 depend vertically downward from the junctures of the stub wings 11 and power tubes 14, the outboard skids 77 cooperating with the fuselage skids 12 to constitute the landing gear. The outboard skids 77 are located immediately inward of the lift outlets 50 in the power tubes 14. Consequently, these skids 77 function as an effective heat shield protecting the fuselage 10 from the heat generated by and the efflux from the engine units 21–26.

To assist in flight control, the aircraft incorporates a usual type of guidance mechanism including a pair of vertical rudders 78, one of which is mounted at each side of the rear end of the fuselage 10 at the rear of each principal landing skid 77, and includes a pair of substantially horizontal ailerons 79, one of which is movably mounted on each side of the fuselage 10 at the rear of the stub wing 11.

It is thought that the functional advantages of this variable thrust propulsion system has become fully apparent from the foregoing detailed description of parts, but for completeness of disclosure, the operation will be briefly described. It will be assumed that the aircraft is supported on the landing skids 12 and 77 and that it is desired to have a substantially vertical take-off.

First, the hydraulic cylinder 73 is actuated and contracted to swing the deflector flaps 52–57 upwardly against the closure seats 46 which precludes discharge of the engine efflux into the thrust tubes 32. The engine units 21–26 draw air into their associated engine chambers 15–20 through the air intakes 30, the air entering the engine intakes 27 and discharging at the engine exhausts 28 into the associated deflector chambers 35–40. The engine efflux is directed by the deflector flaps 52–57 downwardly through the lower discharge passages 47 and downwardly through the outlets 50 for vertical lift.

After the aircraft is air-borne, the hydraulic cylinder 73 is actuated selectively to manipulate the flap-controlling mechanism whereby to position the deflector flaps 52–57 in their lowermost position against the closure seats 51 for forward thrust or to any position between the closure seats 46 and 51 for thrust having both vertical and horizontal components.

Assuming that the deflector flaps 52–57 are swung downwardly againts the closure seats 51 to preclude discharge of the engine efflux through the lift outlets 50, it will be understood that the efflux of the engine units 21 and 22 entering the associated deflector chambers 35 and 40 respectively is directed by the deflector flaps 52–57 into the upper discharge passages 44 and thence into the thrust tubes 32 through the outlets 45. This efflux is discharged from the thrust tubes 32 through the discharge ports 33, thereby providing substantially forward thrust to the aircraft. The successive engine units 21–26 in each thrust bank 13 will discharge their efflux into a common thrust tube 32 for more efficient operation and thrust conversion.

Any intermediate location of the deflector flaps 52–57 will divert engine efflux into both the upper discharge passages 44 and the lower discharge passages 47. Engine efflux discharged into and from the thrust tubes 32 imparts substantially forward horizontal motion to the aircraft while engine efflux discharged vertically from the power tubes 14 imparts substantially vertical motion. Consequently, a combination of horizontal and vertical thrust will propel the aircraft in a diagonal direction.

Although the invention has been described by making detailed reference to a preferred embodiment, such detail is to be understood in an instructive, rather than in any restrictive sense, many variants being possible within the scope of the claims hereunto appended.

I claim as my invention:

1. A variable thrust propulsion system for a jet-powered aircraft, comprising:
    (a) an elongate power tube,
    (b) a plurality of jet engine units mounted in the power tube and located in adjacent relation with their intakes orientated in one longitudinal direction and their exhausts orientated in the opposite longitudinal direction,
    (c) an elongate thrust tube extending longitudinally adjacent to the power tube, the thrust tube having a discharge port directing efflux rearwardly, and
    (d) control means selectively directing the efflux of the engine units from the power tube into the thrust tube for forward thrust or downwardly from the power tube for lift.

2. A variable thrust propulsion system as defined in claim 1, in which:
    (e) duct means in the power tube interconnects longitudinally adjacent engine units for passing the heated ambient air of one engine unit to the intake of the next adjacent and rearwardly located engine unit.

3. A variable thrust propulsion system as defined in claim 1, in which:
    (e) the thrust tube has a progressively increasing cross-sectional area longitudinally to accommodate the efflux directed into the thrust tube along its length from successive engine units.

4. A variable thrust propulsion system as defined in claim 1, in which:
    (e) the power tube includes a plurality of engine chambers lengthwise of the tube, each chamber housing an engine unit,
    (f) the power tube includes a deflector chamber located rearwardly of each engine chamber,
    (g) the power tube includes an exit passage communicating the exhaust of each engine unit with its associated deflector chamber, and
    (h) the control means includes an adjustable element in each deflector chamber selectively diverting efflux from the deflector chamber to the thrust tube or downwardly from the power tube.

5. A variable thrust propulsion system as defined in claim 4, in which:
    (i) duct means in the power tube interconnects the engine chambers of longitudinally adjacent engine units for passing heated ambient air of one engine unit in one chamber to the engine chamber and intake of the next adjacent and rearwardly located engine unit, the duct means bypassing the deflector chamber of said one engine unit.

6. A variable thrust propulsion system as defined in claim 1, in which:

(e) the power tube includes a plurality of engine chambers lengthwise of the tube, each chamber housing an engine unit, (f) the power tube includes a deflector chamber located rearwardly of each engine chamber, the deflector chamber having a first outlet port to the thrust tube and having a second outlet port directed downwardly, (g) the power tube includes an efflux transfer chamber communicating the exhaust of each engine unit with its associated deflector chamber, (h) the control means includes a deflector flap mounted in each deflector chamber and movable selectively between a first position to close the first outlet port and divert efflux through the second outlet for lift, and a second position to close the second outlet and divert efflux through the first outlet and into the thrust tube, and (i) means controlling the movement of the deflector flaps.

7. A variable thrust propulsion system as defined in claim 6, in which:

(j) the flap-controlling means synchronizes movement of the deflector flaps and includes a pair of spaced elongate links extending lengthwise of the power tube, (k) a plurality of crosshead yokes located between and interconnecting the links, and (l) a shaft attached to each deflector flap and attached to one of the yokes, (m) the links causing simultaneous rotative movement of the yokes and associated shafts to oscillate the flaps between their first and second positions.

8. A variable thrust propulsion system as defined in claim 7, in which:

(n) means interconnects the spaced links and imparts longitudinal movement in opposite directions to the respective links to cause rotation of the shafts selectively in either direction incident to positioning of the flaps.

9. A variable thrust propulsion system as defined in claim 8, in which:

(o) resilient means operatively interconnect the spaced links and tend to balance the torsional force exerted on the yokes by the gravitational action of the deflector flaps through the connecting shafts.

10. A variable thrust propulsion system as defined in claim 1, in which:

(e) a plurality of elongate power tubes are laterally spaced in substantially parallel relation, (f) each power tube includes a plurality of engine chambers lengthwise of the tube, and each chamber houses an engine unit, (g) a plurality of elongate thrust tubes extend longitudinally adjacent to the power tubes, at least one thrust tube being associated with each power tube, (h) each power tube includes a plurality of deflector chambers, one of which is located rearwardly of each engine chamber, each deflector chamber having a first outlet port to the associated thrust tube and having a second outlet port directed downwardly, (i) means in each power tube directing the exhaust of each engine unit into the associated deflector chamber, (j) the control means includes a deflector flap mounted in each deflector chamber and movable selectively between a first position to close the first outlet port and divert efflux through the second outlet for lift, and a second position to close the second outlet and divert efflux through the first outlet and into the associated thrust tube, and (k) flap-controlling means interconnects and synchronizes movement of the deflector flaps in the power tubes.

11. A variable thrust propulsion system as defined in claim 10, in which:

(l) the flap-controlling means includes a pair of spaced elongate links extending lengthwise of each power tube, (m) a plurality of crosshead yokes are located between and interconnect each pair of spaced links, and (n) a plurality of shafts are attached to the deflector flaps of each power tube and are connected to the yokes of the associated pair of spaced links, and (o) at least one shaft extends between and interconnects a yoke of each pair of spaced links, whereby to cause simultaneous rotative movement of the yokes and associated shafts to oscillate the deflector flaps of each power tube between the first and second positions.

No references cited.

CARLTON R. CROYLE, *Primary Examiner.*